(12) United States Patent
Goncalves et al.

(10) Patent No.: US 9,685,839 B2
(45) Date of Patent: Jun. 20, 2017

(54) BEARING IMPLEMENTATION FOR A ROTATING ELECTRICAL DEVICE

(71) Applicant: FXQ Engineering Group, Naugatuck, CT (US)

(72) Inventors: Filipe Goncalves, Naugatuck, CT (US); Chong Kyu Kim, Fort Lee, NJ (US)

(73) Assignee: FXQ Engineering Group, LLC, Naugatuck, CT (US)

( * ) Notice: Subject to any disclaimer, the term of this patent is extended or adjusted under 35 U.S.C. 154(b) by 756 days.

(21) Appl. No.: 14/041,650

(22) Filed: Sep. 30, 2013

(65) Prior Publication Data
US 2014/0285071 A1   Sep. 25, 2014

Related U.S. Application Data

(60) Provisional application No. 61/803,703, filed on Mar. 20, 2013.

(51) Int. Cl.
*H02K 7/08*   (2006.01)
*H02K 5/173*   (2006.01)
(Continued)

(52) U.S. Cl.
CPC ............. *H02K 7/083* (2013.01); *F16C 19/56* (2013.01); *F16C 35/061* (2013.01); *H02K 5/173* (2013.01); *F16C 2380/26* (2013.01)

(58) Field of Classification Search
CPC .... H02K 5/173–5/1737; H02K 15/00–15/165; H02K 7/083; F16C 35/061; F16C 19/56
(Continued)

(56) References Cited

U.S. PATENT DOCUMENTS 4,335,323 A * 6/1982 Kebbon .................. H02K 1/17
                                                    310/154.09
4,664,539 A   5/1987 Li
(Continued)

FOREIGN PATENT DOCUMENTS

| EP | 1 253 307 A2 | 10/2002 |
|----|--------------|---------|
| EP | 1 071 888 B1 | 8/2005 |
| EP | 2 194 285 A1 | 6/2010 |
| EP | 2 148 102 B1 | 5/2013 |
| JP | 2006-311717 A | 11/2006 |

(Continued)

OTHER PUBLICATIONS

Prior Art Search Report from KIPO-Designated Search Agency, Korean Patent Application No. 10-2014-0005945, Feb. 4, 2016, pp. 1-39.

*Primary Examiner* — Thomas Truong
(74) *Attorney, Agent, or Firm* — Cesari and McKenna, LLP

(57) ABSTRACT

In one embodiment, an electric motor includes at least three bearings. The ball bearing utilized in the three bearings may be sized based on benchmark surface areas associated with the ball bearing utilized in a conventional electric motor having two bearings. Moreover, a technique may be implemented to reduce the diameter at a point on the shaft where a backup or second bearing makes contact with the shaft. When the motor begins to operate, for example, at a first time, the at least three bearings together handle a the load coming through the motor. When the front-most bearing degrades to a predetermined point or fails, for example, at a second time, the load transitions from the front most bearing to the second or backup bearing in the front plate.

11 Claims, 4 Drawing Sheets

(51) Int. Cl.
*F16C 19/56* (2006.01)
*F16C 35/06* (2006.01)

(58) Field of Classification Search
USPC .......................................................... 310/90
IPC ........................ H02K 7/08,5/173; F16C 19/56
See application file for complete search history.

(56) References Cited

U.S. PATENT DOCUMENTS

| | | |
|---|---|---|
| 5,642,944 A | 7/1997 | Dublin, Jr. et al. |
| 5,806,988 A | 9/1998 | Dublin, Jr. et al. |
| 5,810,485 A | 9/1998 | Dublin, Jr. et al. |
| 6,712,515 B2 | 3/2004 | Fite et al. |
| 8,106,556 B2 | 1/2012 | Brunet et al. |
| 2002/0190598 A1* | 12/2002 | Bartman ................. F16C 25/08 310/219 |
| 2003/0122435 A1* | 7/2003 | Yamamura ........... H02K 7/1166 310/75 R |
| 2011/0094806 A1* | 4/2011 | Mack .................... H02K 7/003 180/65.6 |
| 2012/0013214 A1 | 1/2012 | Isberg et al. |
| 2012/0308172 A1 | 12/2012 | Shaikh |

FOREIGN PATENT DOCUMENTS

| | | |
|---|---|---|
| JP | 2012-255499 A | 12/2012 |
| KR | 100421076 B1 | 2/2004 |
| KR | 1020100083906 A | 7/2010 |
| KR | 1020130002026 A | 1/2013 |
| WO | WO 03/058081 | 7/2003 |
| WO | WO 2011/004225 | 1/2011 |

* cited by examiner ate plate of the motor. All the bearings may be pressed on a shaft of the motor. Rolling element bearings, such as bearing balls, are utilized in each of the bearings and may be sized based on benchmark surface areas associated with the bearing balls utilized in a conventional electric motor having two bearings, to meet desired efficiency standards, e.g., governmental efficiency standards. Moreover, a technique may be implemented to reduce the diameter, and in turn, the friction, at a point on the shaft where the backup or second bearing makes contact with the shaft.

BEARING IMPLEMENTATION FOR A ROTATING ELECTRICAL DEVICE

RELATED APPLICATIONS

The present application claims priority to U.S. Provisional Patent Application No. 61/803,703, filed on Mar. 20, 2013 by Filipe Goncalves for a "Bearing Implementation Method for Rotating Electrical Equipment", the contents of which are incorporated by reference herein in their entirety.

BACKGROUND

Technical Field

The present application relates to a bearing implementation for a rotating electrical device, and more specifically to a bearing implementation for an electric motor having at least three bearings.

Background Information

Electric motors are typically mounted with a front and a rear bearing with the intended purpose of providing a stable rotating environment for the rotor, thus turning electrical power into mechanical power. These bearings typically are rolling-element bearings that carry load by placing rolling elements (e.g., bearing balls) between two bearing rings. To maximize efficiency and to minimize losses due to friction, the selection of bearings, specifically the size of bearing balls used in the bearings, is generally carefully taken into consideration in the engineering and design process. Selecting a bearing configuration with larger diameter bearing balls normally provides longer bearing life, due to the ability of the bearing balls to better handle the load when compared to a configuration of smaller diameter bearing balls. However, as ball diameter is increased, the efficiency of the motor generally will drop as a result of increased friction losses resulting from increased surface area contact arising from the larger ball diameter. Therefore, in the engineering and design process there is generally a compromise in the selection of ball size, in order to yield a final motor design that provides sufficient bearing life and that meets desired efficiency standards, e.g., minimum governmental efficiency standards.

Bearing degradation and failure is often cited as one of the main causes of failure in electric motors. Due to the nature of electric motors, when a failure occurs, it typically happens on the front bearing. The front bearing generally handles the majority of the load incident upon the motor, and therefore generally fails before the rear bearing. When the front bearing fails, the entire motor will come to a stop resulting in unscheduled downtime, causing a direct financial loss to the end user in a production or critical uptime environment. Further, in some cases, the laminations in the rotor and stator will be damaged due to their collision after degradation of the front bearing. Thus, the end user often suffers financial costs associated with repairing or replacing the motor, and other costs associated with the down time of the motor.

SUMMARY

In one embodiment, the operation of an electric motor is improved by including at least three bearings in the motor. Two or more bearings, for example, a front-most bearing and a backup or second bearing, are placed in a front plate of the motor. The two or more bearings may be embodied as individual and separate bearings, or as multiple bearings (e.g., dual bearings). One or more bearings are placed in a rear plate of the motor. All the bearings may be pressed on a shaft of the motor. Rolling element bearings, such as bearing balls, are utilized in each of the bearings and may be sized based on benchmark surface areas associated with the bearing balls utilized in a conventional electric motor having two bearings, to meet desired efficiency standards, e.g., governmental efficiency standards. Moreover, a technique may be implemented to reduce the diameter, and in turn, the friction, at a point on the shaft where the backup or second bearing makes contact with the shaft.

When a motor including at least three bearing begins to operate, for example, at a first time, the at least three bearings together handle the load coming through the motor. Typically, the front most bearing in the front plate will be the first one to degrade or fail. When the front most bearing in the front plate degrades to a predetermined point or fails, for example, at a second time, the load being handled by the front most bearing transitions or begins transitioning from the front most bearing to the second or backup bearing in the front plate.

Advantageously, an electric motor including the at least three bearings may meet desired efficiency standards, e.g., minimum governmental efficiency standards, and continue to operate despite degradation or failure of a bearing. Moreover, an electric motor including at least three bearings may be more environmentally sustainable preventing damage to rotor and stator laminations, may reduce or eliminate the need for mid-shift shutdowns to replace failed motors, and may reduce costs associated with down time.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
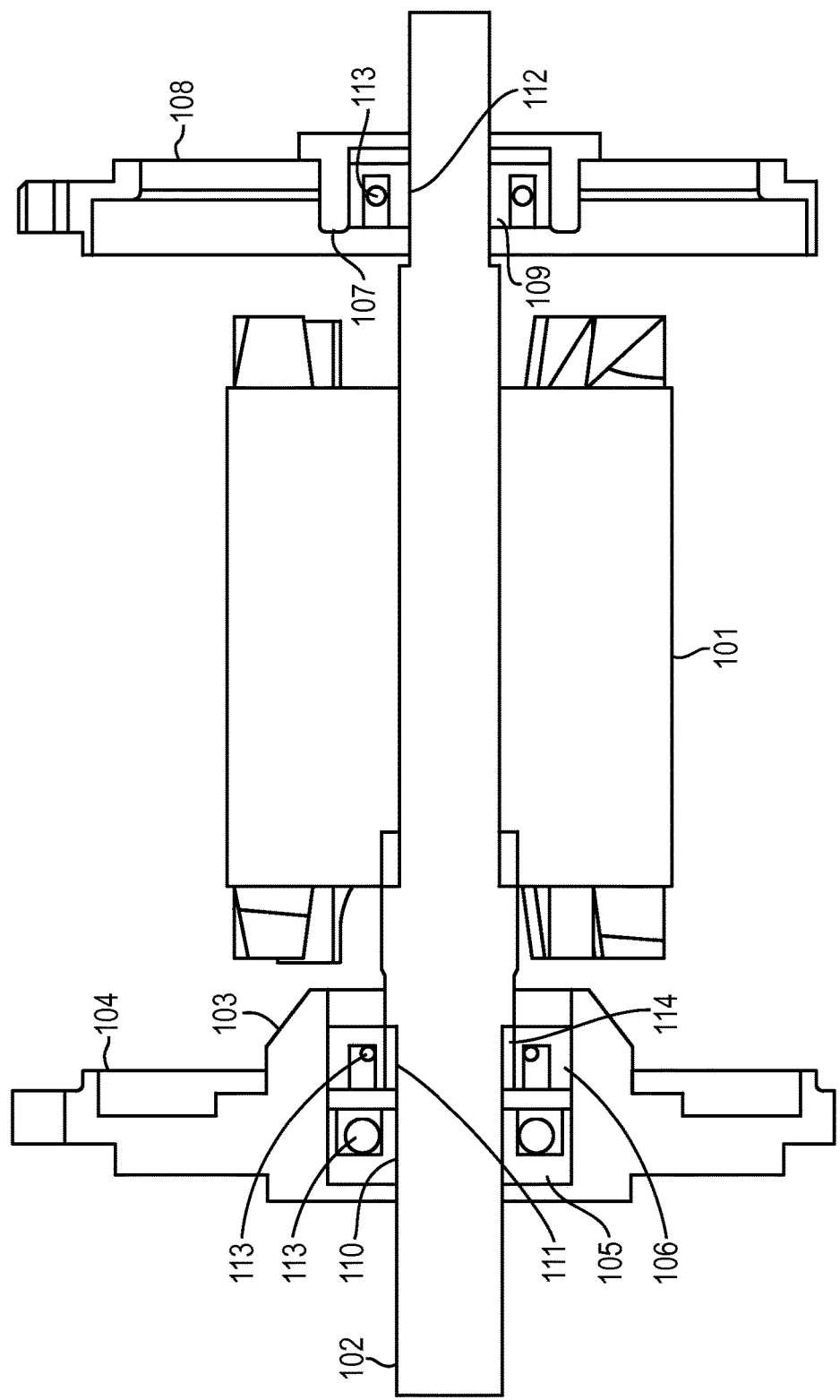
FIG. 1 depicts a cross section view of an example electric motor including at least three bearings.

FIG. 1 depicts a cross section view of an example motor that includes at least three bearings. The motor 100 includes a rotor 101 that is pressed onto a shaft 102. Further, the motor 100 includes a housing 103 of a front plate 104, wherein the housing 103 maintains or holds two or more front bearings, for example, a front-most bearing 105 that is located furthest towards a proximal end of the shaft 102 and a backup or second bearing 106 that is located behind the front-most bearing 105, and is designed to handle the load for the front-most bearing 105 when the front-most bearing 105 degrades to a certain point or fails. In some instances, the front plate 104 may have to be modified to accommodate the two or more front bearings 105 and 106 or to meet desired performance and/or structural requirements. The two or more front bearings 105 and 106 may be embodied as individual and separate bearings within the housing 103, or the front-most bearings 105 and backup or second 106 may be components of a multiple bearing (e.g., a dual bearing) within the housing 103. The motor 100 further includes a housing 107 of a rear plate 108, wherein the housing 107 maintains or holds one or more rear bearings 109, located towards a distal end of the shaft 102.

The bearings 105, 106, and 109 are each respectively associated with locations 110, 111, and 112 on the shaft 102. Specifically, the bearings 105, 106, and 109 each respectively make contact with the shaft 102 at locations 110, 111, and 112. Moreover, a fiber ring 114 may be optionally placed at location 111 on the shaft 102 to create a better fit between the bearing 106 and the shaft 102.

Each of the bearings 105, 106, and 109 contain rolling element bearings, such as bearing balls 113. The sizes of each bearing ball 113 may be chosen based on mathematical formulas and utilizing benchmark surface areas associated with the size of bearing balls utilized in a conventional motor that includes only two bearings.

In an embodiment having exactly three bearings, (a front-most bearing and a backup or second bearing, and a single rear bearing), the selection of the sizes of the bearing balls 113 may be based on the following criteria and constraints as well to ensure that the bearings 105, 106, and 109 of the motor 100 meet desired efficiency standards, e.g., minimal governmental efficiency standards:

1. The surface area of the bearing balls 113 in the front-most bearing 105 is within a predetermined amount of a benchmark surface area of the bearing balls in a front bearing of a conventional motor having two bearings;
2. The surface area of the bearing balls 113 in the backup or second bearing 106 plus the surface area of bearing balls 113 in the rear bearing 109 is within a predetermined amount of a benchmark surface area of the bearing balls in a rear bearing of a conventional motor having two bearings;
3. The surface area of the bearing balls 113 in the front-most bearing 105 is greater than the surface area of the bearing balls 113 in the backup or second bearing 106, and the surface area of the bearing balls 113 in the backup or second bearing 106 is greater than the surface area of the bearing balls in the rear bearing 109.
4. The total surface area of the bearing balls 113 in all bearings 105, 106, and 109 is within a predetermined amount of a benchmark surface area of the bearing balls within the two bearings of a convention motor.

To determine or obtain benchmark surface area of bearing balls in a conventional motor having two bearings, that are utilized to determine the corresponding surface areas of the bearing balls for the motor having at least three bearings, the following formulas may be used:

$$A = 4\pi r^2 \quad \quad 1.$$

$$Ap = A * X \quad \quad 2.$$

$$B = Ap * n \quad \quad 3.$$

$$TB = (Ap1 * n1) + (Ap2 * n2) \quad \quad 4.$$

where A is the surface area of a sphere, Ap is the ball surface area in contact with the bearing racetrack, X is the fractional surface area of the bearing ball which is in contact with the racetrack, B is the total bearing ball surface area in contact with the bearing racetrack for an entire bearing, n is the number of bearing balls in a bearing, and TB is the total benchmark bearing ball surface area present in a conventional bearing assembly, where Ap1*n1 is the total for the front bearing and Ap2*n2 is the total for the rear bearing. Although reference is made to bearing balls, it is expressly contemplated that any rolling elements bearings and the corresponding formulas may be utilized.

The calculated total benchmark bearing ball surface area, based on the attributes of the bearings balls of a motor having two bearings, may serve to guide the final bearing selection for the motor having at least three bearings. For example, a bearing assembly of a conventional motor where both bearings are identical, having six bearing balls each with a radius of 1.5 mm for each ball, where X is equal to ⅕, will yield a total benchmark surface area of 67.86 mm². Since the surface area of the bearings balls is directly proportional to efficiency losses resulting from friction, it is desirable that the total surface area of the bearing balls 113 in bearings 105, 106, and 109 for a motor 100 having at least three bearings is similar, or within a predefined amount, of the calculated benchmark surface area. Further, the surface area of the bearing balls 113 in bearings 105, 106, and 190 for a motor having at least three bearings 100 should meet the conditions as described above.

Referring back to FIG. 1, a technique may be applied at the location 111 on the shaft 102 to reduce the diameter at the location 111 on the shaft 102. Reducing the diameter at the location 111 may result in reduced friction between the backup or second bearing 106 that is engaged with the shaft 102. The reduced friction creates a looser fit between the backup or second bearing 106 and the shaft 102. This may help in meeting desired efficiency standards, e.g., government efficiency standards. In addition, reducing the diameter may translate to a slower wear of the bearing balls 113 in the backup or second bearing 106. As the front-most bearing 105 wears down, the backup or second bearing 106 will generally not wear down as quickly. As a result of reducing the diameter at the location 111, when the front-most bearing 105 begins to wear down to a point where the failure of the front-most bearing 105 is likely, the load starts to naturally transition to the backup or second bearing 106.

The diameter at the location 111 on the shaft 102 may be reduced using any of a variety of techniques. For example, a shaft polishing technique, or other diameter reducing technique as known by those skilled in the art, may be applied to reduce the diameter of the shaft by 4-5 hundredths of a millimeter at the location 111. This allows for reduced surface contact (e.g., a looser fit) between the backup or second bearing 106 and the shaft 102. As a result, the backup or second bearing 106 initially experiences less load since it is in reduced contact with shaft 102 and further away from the load source than the front-most bearing 105. When, for example, the bearing balls 113 of the front-most bearing 105 wear 4-5 hundredths of a millimeter, the load may begin transitioning to the backup or second bearing 106. Consequently, due to the remaining life of the backup or second bearing 106, unscheduled downtime may be avoided, giving an end user additional time to react to bearing wear.

To determine the amount of the diameter that is to be reduced at the location 111 on the shaft 102, where the backup or second bearing 106 will reside, the following formula may be used:

$$Shp = Sd - (Sd * X)$$

where Shp is an amount of shaft diameter to be reduced at the location 111 where the backup or second bearing 106 will reside, Sd is a standard shaft diameter recommendation according to a bearing manufacturer or bearing specifications, and X is a fractional value which can vary based on factors such as bearing ball size, engineering constraints dictated by the system design or end application.

Referring back to FIG. 1, a fiber ring 114 may be optionally placed at the location 111 on the shaft 102 to create a better fit between the backup or second bearing 106 and the shaft 102. Fiber has a slightly elastic behavior that may be helpful to take up any play where the diameter of the shaft is reduced, to create a better fit, so the backup or second bearing 106 is not "too loose" on the shaft 102.

Figure 2:
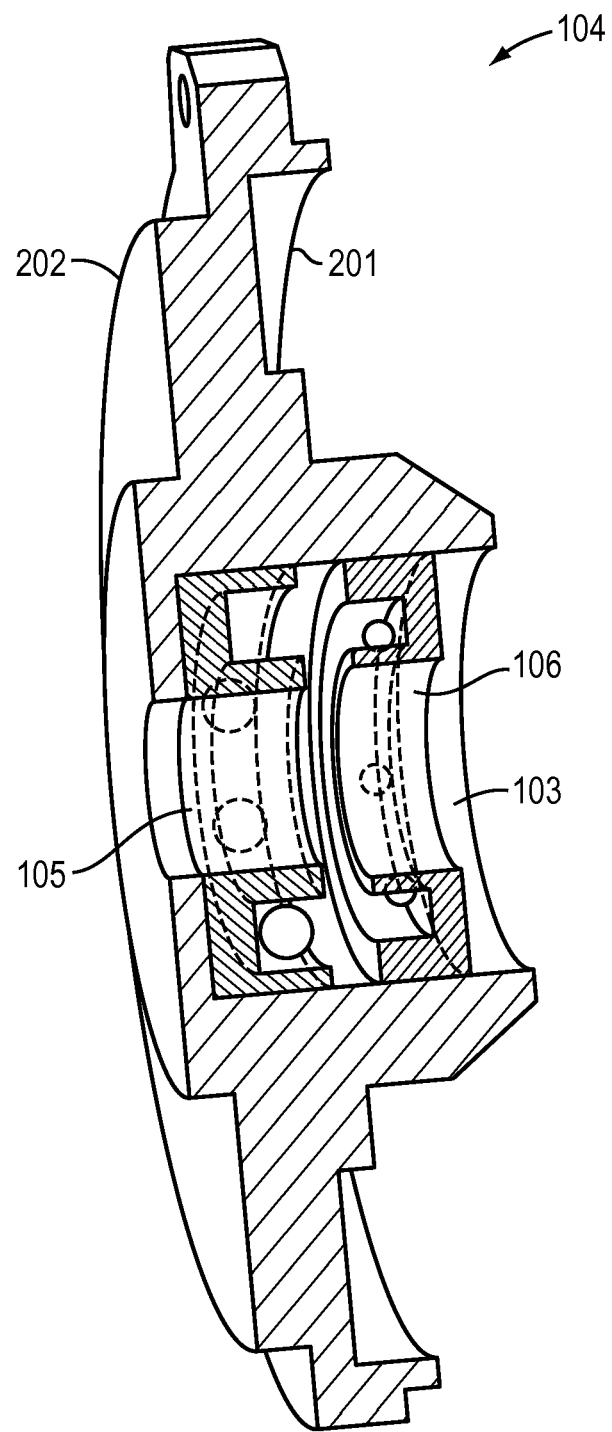
FIG. 2 depicts a cross section view of an example front plate that may be utilized by the motor of FIG. 1 including at least three bearings.

FIG. 2 depicts a cross section view of an example front plate that may be utilized by the motor 100 including at least three bearings. The front plate 104 has an inner surface 201, an outer surface 202, and a housing 103 that maintains or holds the two or more front bearings, in one embodiment, the front-most bearing 105 and the backup or second bearing 106.

The front plate 104 may be based on a design of a conventional front plate, with modifications thereto as required. A conventional front plate may be subject to analysis to determine if its housing has the necessary space to accommodate the front bearings 105 and 106. Further, a conventional front plate may be subject to analysis to determine if it meets desired performance and/or structural requirements. If it is determined that a conventional front plate has enough space, and meets the desired performance and/or structural requirements, the conventional front may be used as the front plate 104 of the motor 100 having at least three bearings, to house the front bearings 105 and 106. However, if it is determined that the conventional front plate does not have enough space or that it does not meet the desired performance and/or structural requirements, the conventional front plate 104 may be modified, before use as the front plate 104 of the motor 100 having at least three bearings.

Figure 3:
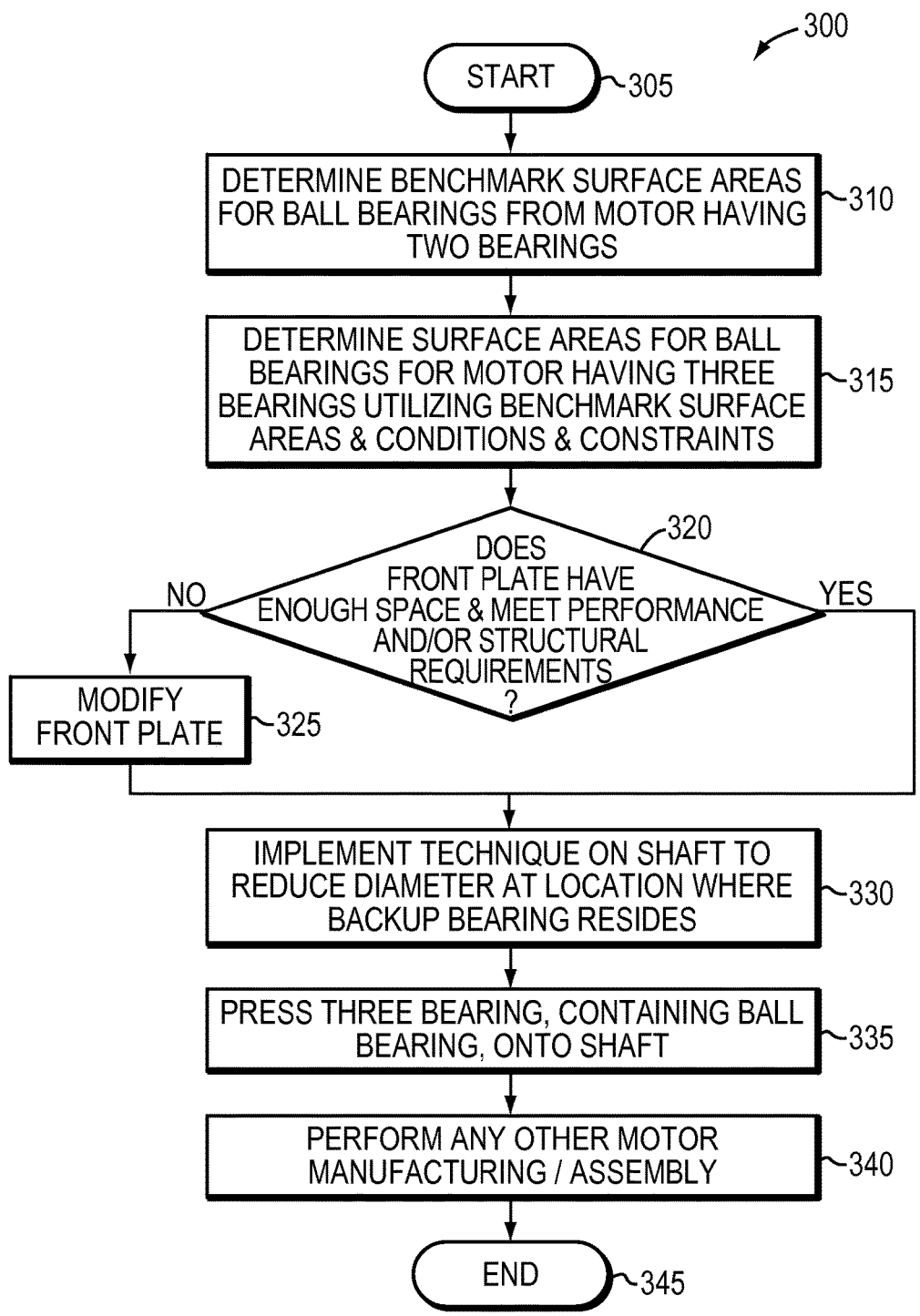
FIG. 3 is an example procedure for assembling a motor including at least three bearings.

FIG. 3 is an example procedure for assembling a motor having at least three bearings. The procedure 300 starts at step 305 and continues to step 310, where benchmark surface areas for bearing balls utilized in a conventional motor having two bearings are determined. For example, and as described above, the various formulas may be utilized to determine the surface areas for the bearing balls. At step 315, the benchmark surface areas and defined conditions and constraints are utilized to determine the surface areas, and in turn, dimensions, of the bearing balls to be used in the at least three bearings. For example, and with reference to FIG. 1, the benchmark surface areas and defined conditions and constraints are utilized to determine the surface areas of the front-most bearing 105, the backup or second 106, and the rear bearing 109 of the motor 100. As described above, the conditions and constraints may indicate the relative size of the bearing balls in a particular bearing to the size of the bearing balls in the other bearings. At step 320, it is determined if a conventional front plate has enough space and meets specific performance and/or structural requirements. If a conventional front plate has enough space and meets the specific performance and/or structural requirements, the procedure continues to step 330. However, if the conventional front plate does not have enough space or does not meet the specific performance and/or structural requirements, the procedure branches off to step 325, and the conventional front plate is modified to make more space for the two front bearings and/or to meet the performance and/or structural requirements.

At step 330, a technique is implemented on the shaft of the motor to reduce the diameter at a location on the shaft where the backup or second bearing resides, and the shaft is prepared for the at least three bearings. For example, and with reference to FIG. 1, the technique may be implemented to reduce the diameter of the shaft 102 at a location 111 where the backup or second bearing 106 makes contact with or engages with the shaft 102, to reduce the friction between the backup or second bearing 106 and the shaft 102. It is noted that a fiber ring, such as fiber ring 114, may optionally be placed at the location 111 to create a better fit between bearing 106 and shaft 102. At step 335, the at least three bearings that house the bearing balls are pressed onto a prepared shaft surface, as know by those skilled in the art. For example, and with respect to FIG. 1, bearings 105, 106, and 109, that house bearing balls 113, are pressed onto the shaft 102 at their respective locations 110, 111, and 112. It is noted that the front-most bearing 105 and the backup or second 106 may be individual bearings or may be components of a multiple bearing (e.g., a dual bearing), as known by those skilled in the art. At step 340, other traditional motor manufacturing and motor assembly steps that are needed to produce a working electric motor, as known by those skilled in the art, are performed. At step 345, the procedure ends.

Figure 4:
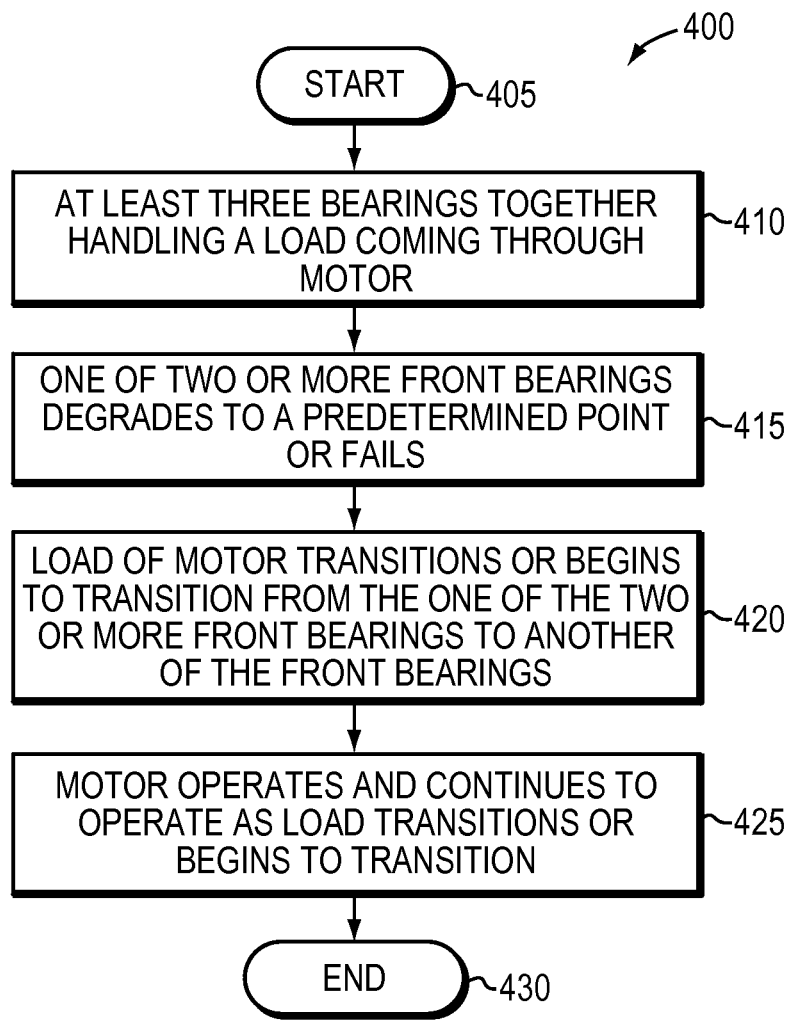
FIG. 4 is an example procedure for the operation of a motor including at least three bearings.

FIG. 4 is an example procedure for the operation of a motor including at least three bearings. The procedure 400 starts at step 405 and continues to step 410, where the at least three bearings together handle a load coming through the motor as the motor operates. For example, and with reference to FIG. 1, a front-most bearing 105, a backup or second bearing 106, and a single rear bearing 109 in a motor 100 handle the load coming through motor 100 at a first time. At step 415, one of two or more front bearings degrades to a predetermined point or fails. For example, the front-most bearing 105 degrades to a predetermined point or fails. At step 420, the load of the motor transitions or begins to transition from the one of the two or more front bearings to another of the front bearings. For example, and with reference to FIG. 1, the load of motor 100 being handled by the front-most bearing 105 begins to transition from the front-most bearing 105 to the second or backup bearing 106 at a second time, when the front-most bearing 105 degrades to a predetermined point or fails. At step 425, the motor operates and continues to operate as the load transitions or begins to transition. For example, and with reference to FIG. 1, the front-most bearing 105 and the second or backup bearing 106 in the front plate, and the rear bearing 109 in the rear plate together handle the load coming through the motor as the load being handled by the front-most bearing 105 transitions from the front-most bearing 105 to the second or backup bearing 106. Advantageously, due to the remaining life of the other front bearing (e.g., second or backup bearing 106), an unscheduled downtime event is potentially avoided, giving an end user additional time to react to the bearing wear. At step 430, the procedure ends.

The foregoing description described certain example embodiments. It will be apparent, however, that other variations and modifications may be made to the described embodiments, with the attainment of some or all of their advantages. For instance, it is expressly contemplated that the description herein may be applied to a variety of different types of rotating electrical equipment, as well as various types of bearings. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. An electric motor, comprising:
a rotor;
a front plate configured to house at least a first front bearing and a second front bearing;
a rear plate configured to house at least one rear bearing, wherein the first front bearing is furthest towards a proximal end of a shaft of the electrical motor among the first front bearing, the second front bearing, and the at least one rear bearing; and
the shaft having: a first diameter associated with a first location where the first front bearing makes contact with the shaft, a second diameter associated with a second location where the second front bearing makes contact with the shaft, and a third diameter associated with a third location where the at least one rear bearing makes contact with the shaft,
wherein the second diameter of the shaft at the second location is reduced relative to the first diameter of the shaft at the first location utilizing a polishing technique and the second front bearing is closer to the rotor than the first front bearing along the shaft, and
wherein the second front bearing initially has reduced surface contact and a looser fit with the shaft at the second location relative to the first front bearing at the first location and the second front bearing initially handles reduced load associated with the electric motor relative to the first front bearing.

2. The electric motor of claim 1, further comprising: a fiber ring placed on the shaft at the second location where the second front bearing makes contact with the shaft.

3. The electric motor of claim 1, wherein the first front bearing and the second front bearing are individual and separate bearings.

4. The electric motor of claim 1, wherein the first front bearing and the second front bearing are components of a dual bearing.

5. The electric motor of claim 1, wherein the front plate includes space to accommodate the first front bearing and the second front bearing.

6. The electric motor of claim 1, wherein the first front bearing, the second front bearing, the at least one rear bearing, and the shaft are arranged such that the first front bearing, the second front bearing, and the at least one rear bearing together initially handle the load associated with the electric motor at a first time, and a portion of the load handled by the first front bearing transitions or begins to transition to be handled by the second front bearing at a second time.

7. The electric motor of claim 6, wherein at the second time, the first front bearing degrades by a predetermined amount or fails.

8. An electric device, comprising:
a rotor;
a front plate configured to house at least a first front bearing and a second front bearing;
a rear plate configured to house a rear bearing, wherein the first front bearing is furthest towards a proximal end of a shaft of an electrical motor among the first front bearing, the second front bearing, and the rear bearing; and
the shaft, that extends between the front plate and the rear plate, wherein a diameter of the shaft is reduced at a location where the second front bearing makes contact with the shaft
wherein the second front bearing is closer to the rotor than the first front bearing along the shaft,
and wherein the second front bearing initially has reduced surface contact and a looser fit with the shaft at the second location relative to the first front bearing at the first location and the second front bearing initially handles reduced load associated with the electric motor relative to the first front bearing.

9. The electric device of claim 8, wherein the reduced diameter is obtained utilizing a polishing technique.

10. The electric device of claim 8, further comprising: a fiber ring placed on the shaft at the location where the second front bearing makes contact with the shaft.

11. The electric device of claim 8, wherein the front plate includes space to accommodate the first front bearing and the second front bearing.

* * * * *